Dec. 12, 1933.  H. D. GEYER  1,939,444
SPRING SHACKLE
Filed July 30, 1932  2 Sheets-Sheet 1

Inventor
Harvey D. Geyer
By Spencer Hardman & Fehr
his Attorneys

Dec. 12, 1933.    H. D. GEYER    1,939,444
SPRING SHACKLE
Filed July 30, 1932    2 Sheets-Sheet 2

Inventor
Harvey D. Geyer
By Spencer Hardman & Fehr
his Attorneys

Patented Dec. 12, 1933

1,939,444

UNITED STATES PATENT OFFICE 1,939,444

SPRING SHACKLE

Harvey D. Geyer, Dayton, Ohio, assignor to The Inland Manufacturing Company, Dayton, Ohio, a corporation of Delaware Application July 30, 1932. Serial No. 626,994

9 Claims. (Cl. 267—54)

This invention relates to spring shackles and similar hinge joints, especially such as are adapted for use on automobiles where the conditions under use are severe.

An object of this invention is to provide a pivot or hinge joint which is highly efficient in use as a spring shackle joint for automobiles due to its property of preventing relative side movement of the hinged parts connected thereby.

Another object is to provide such a pivot joint which eliminates noise by isolating the connected parts with resilient non-metallic material but nevertheless substantially prevents internal twist in the non-metallic material and also any relative sliding of a part of the non-metallic material.

Another object is to provide such a pivot joint which will run for very long periods without lubrication service or wear take-up due to its self-lubricating property and due to its prevention of relative lateral movement of the pivoted parts.

Another object is to provide such a pivot joint which can be economically manufactured as a completely and permanently assembled unit which requires no adjustment of any kind at the time it is assembled in a simple manner to the parts to be connected thereby.

Further objects and advantages of the present invention will be apparent from the following description, reference being had to the accompanying drawings, wherein a preferred embodiment of one form of the present invention is clearly shown.

In the drawings.

Similar reference characters refer to similar parts throughout the several views.

Figure 2:
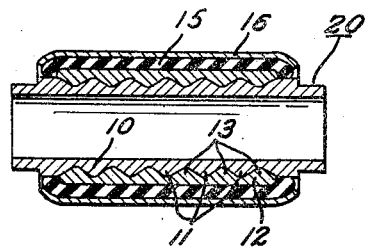
Fig. 2 is a vertical section through the shackle unit prior to its assembling upon the spring and chassis frame.
Figure 3:
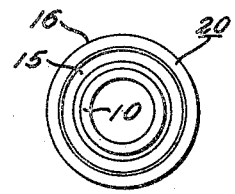
Fig. 3 is an end view of Fig. 2.
Figure 1:
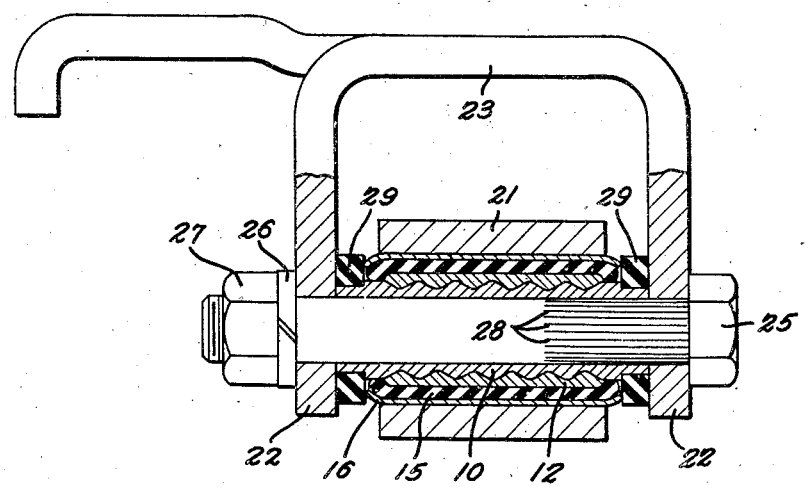
Fig. 1 is a vertical section through an automobile spring shackle embodying this invention, the view being taken through the front end of the rear leaf spring.

Referring to Figs. 1, 2, and 3, the shackle unit comprises a tubular pivot pin 10 whose outer bearing surface has a series of peripheral or circular corrugations 11 extending therearound. A metal bushing 12, preferably of a finely porous oil-absorbing bronze compound, surrounds the pin 10 with a running or sliding fit and has the corrugations 13 on its inner surface which interengage and fit neatly around the corrugations 11 on pin 10 as clearly shown.

This bushing 12 is preferably in one piece and permanently assembled upon the corrugated pin 10 at the time it is shaped to final form. This may be done by first forming bushing 12 with a smooth or cylindrical interior surface and just large enough to slip over the corrugated hardened metal pin 10. Bushing 12, thus assembled upon pin 10, is then compressed radially inward, preferably by means of a swaging tool, until its interior surface is forced down between the grooves or valleys between corrugations 11 and thus the complementary corrugations 13 of the desired depth are formed therein. Since bushing 12 is of porous bronze such formation of the corrugations 13 can be readily accomplished due to its compressibility and malleability. Preferably the corrugations 11 on pin 10 are rounded smooth on their apices and have such angularity to their side walls as will facilitate the proper formation of the corrugations 13 in bushing 12 when it is radially compressed thereupon. The porous bronze bushing 12 is impregnated with lubricating oil or other lubricant to render it self-lubricating. It will now be clear that bushing 12 is permanently mounted upon pin 10 so that it can readily rotate thereupon to provide the necessary pivot movement but that the intergaging corrugations 11 and 13 will prevent relative axial movement between the two. The side surfaces of the series of corrugations 11 and 13 provide a well-lubricated and very strong thrust bearing which carries the lateral load upon the pivot joint due to "side sway" of the automobile body which occurs when turning corners. Hence no additional end thrust bearings are required and there can be no lateral play in the shackles which will cause a clicking noise and wear.

As shown in Fig. 2, a resilient non-metallic bushing 15, preferably of a high grade resilient rubber, encases the metal bushing 12 and is retained thereupon under high initial compression by the exterior metal sleeve 16. The rubber bushing 15 and metal sleeve 16 are preferably first made of such diameter as to slip easily over bushing 12 and are then reduced in diameter by a swaging operation to highly compress the rubber bushing and axially elongate same so that the rubber fibers are in tension axially. The high compression upon the rubber bushing 15 gives it a tightly adhering bond to the outer surface of bushing 12 and the inner surface of sleeve 16.

The shackle unit 20 made as described above, may be shipped to the automobile assembling factory and assembled in a simple way upon the cars without possibility of any mechanic changing the compression upon the rubber bushing or otherwise tampering with its essential mechanism. In other words it is substantially fool-proof against improper tampering or adjusting both at the time it is assembled upon the car or at any later time at a repair shop. The shackle unit 20 of Fig. 2 is first pressed into the spring eye 21 with a tight fit, as shown in Fig. 1. The spring eye 21 with the shackle unit 20 therein is properly located between the flanges 22 of the spring bracket 23 fixed to the chassis frame (not shown) and then the bolt 25 is inserted through the tubular pivot pin 10 and lock washer 26 and nut 27 applied and drawn tight to rigidly clamp the ends of pin 10 between the flanges 22. Preferably bolt 25 is provided with sharp serrations 28 which bite into the metal of flange 22 and tubular pin 10 and fix these parts more securely together against relative turning. If desired the soft rubber dust washers 29 may be inserted upon the ends of pin 10 prior to its being placed between flanges 22. Their obvious purpose is to prevent water, mud, dirt, etc., gaining access to the bearing surfaces of the pivot joint.

Figure 4:
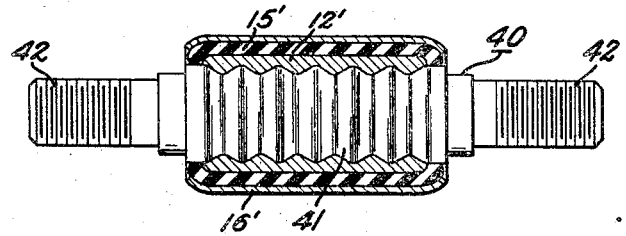
Fig. 4 is a vertical section through a modified form of shackle unit.
Figure 6:
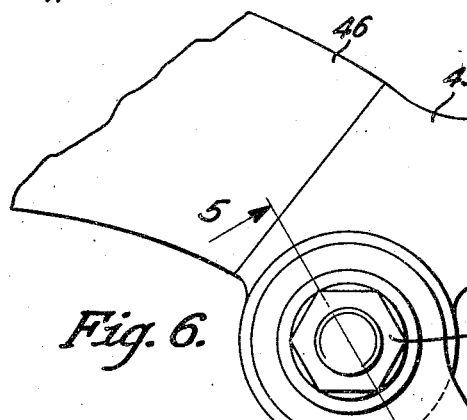
Fig. 6 is a side elevation of Fig. 5.
Figure 5:
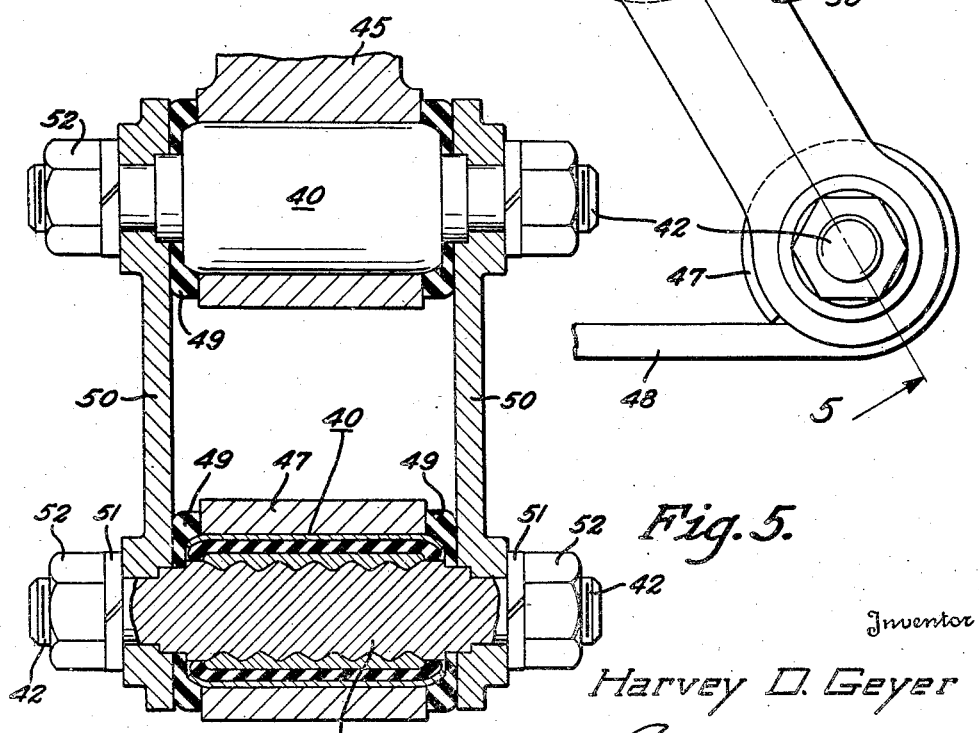
Fig. 5 is a section through the spring shackle at the rear end of an automobile rear spring and embodying the form of shackle unit shown in Fig. 4.

The shackle unit 40 shown in Fig. 4 is similar to that shown in Fig. 2 with the exception of the substitution of the solid pivot pin 41 for the tubular pin 10 of Fig. 2. The unit 40 is made as described above for unit 20 and operates in the same manner. Figs. 5 and 6 show two of these units 40 assembled upon the car at the rear end of the rear leaf spring, forming an extension shackle. One unit 40 is pressed with a tight fit into the suitable hole in the shackle fitting 45 fixed to the end of the chassis side rail 46.

Another unit 40 is pressed into the spring eye 47 at the rear end of the rear leaf spring 48. When it is desired to connect the leaf spring to the chassis frame these parts are brought to the proper relative position and the two shackle links 50 applied to the projecting ends 42 of the pivot pins 41, the lock washers 51 applied, and the nuts 52 drawn up tight to rigidly fix the two pins 41 to the two links 50. If desired the resilient rubber snugly-fitting dust washers 49 may be applied to protect the pivot joints from dirt, etc.

In operation, substantially all the pivotal movement is taken between the corrugated bearing surfaces of pin 41 and metal bushing 12'. These corrugated bearing surfaces also take all lateral thrust upon the pivot joints, as described above. Due to the number of corrugations their combined lateral projected area is quite large and hence these joints can withstand a very high lateral thrust without danger of shearing off the corrugations.

These spring shackles require no lubrication surface of any kind since the porous bronze bearing sleeves are impregnated with sufficient lubricant when the shackle units are first made to last the full normal life of the automobile. If for any reason it becomes necessary to repair the shackle, it is a simple matter to merely press the shackle units 20 or 40 from their retaining recesses or spring eyes and replace same with a new unit which comes completely assembled as described above. The resilient rubber bushings 15 and 15' greatly reduce the transmission of noise and vibration through the spring shackles, and at the same time these rubber bushings are not subject to any material wear due to internal twist since the pivotal movement is practically all taken between the corrugated bearing surfaces.

While the form of embodiment of the present invention as herein disclosed, constitutes a preferred form, it is to be understood that other forms might be adopted, all coming within the scope of the claims which follow.

What is claimed is as follows:

1. A pivot joint connecting two relatively movable members, comprising: a pivot pin having peripheral corrugations therein fixed to one of said members, a one-piece porous metal bushing rotatably mounted upon said peripheral corrugations and retained thereby against relative axial movement, a resilient non-metallic bushing surrounding said metal bushing, the outer surface of said non-metallic bushing being fixed to the other of said relatively movable members.

2. A pivot joint connecting two relatively movable members, comprising: a pivot pin having peripheral corrugations therein fixed to one of said members, a self-lubricating metal bushing rotatably mounted upon said peripheral corrugations and retained thereby against relative axial movement, a resilient non-metallic bushing surrounding said metal bushing, a metal sleeve surrounding and compressing said resilient bushing, said metal sleeve being fixed to the other of said relatively movable parts.

3. A pivot joint forming a hinge connection between two members, comprising: a pivot pin fixed to one of said members and having peripheral enlargements thereon, a self-lubricating metal bushing rotatably mounted upon said pivot pin and retained against relative axial movement by said peripheral enlargements, a resilient non-metallic bushing surrounding said metal bushing, the outer surface of said resilient bushing being attached to the other of said hinged members.

4. A pivot joint forming a hinge connection between two members comprising: a pivot pin fixed to one of said members and having peripheral enlargements thereon, a self-lubricating metal bushing rotatably mounted upon said pivot pin and having its inner surface deformed to co-act with said peripheral enlargements to prevent relative axial movement therebetween, a resilient non-metal bushing surrounding said metal bushing, the outer surface of said resilient bushing being attached to the other of said hinged members.

5. A pivot joint forming a hinge connection between two members, comprising: a pivot pin fixed to one of said members and having peripheral enlargements thereon, a self-lubricating rigid metal bushing rotatably mounted upon said pivot pin and permanently deformed on its inner surface corresponding to said peripheral enlargements to prevent relative axial movement, a non-metallic bushing encasing said rigid metal bushing and having its outer surface attached to the other of said hinged members.

6. A pivot joint forming a hinge connection between two members, comprising: a pivot pin fixed to one of said members and having peripheral enlargements thereon, a porous metal bushing rotatably fitted upon said pivot pin by radially compressing it thereupon to deform its inner surface corresponding to said peripheral enlargements, a resilient bushing surrounding said porous metal bushing, the outer surface of said resilient bushing being secured to the other of said hinged members.

7. A spring shackle adapted to connect the end of a leaf spring to a part, comprising: a pivot member fixed to said part and having peripheral corrugations on its outer surface, a metal bushing rotatably fitted upon said corrugated pivot member by deformation of its inner surface to correspond therewith, a resilient bushing surrounding said metal bushing, the outer surface of said resilient bushing being secured to said leaf spring.

8. A pivot joint unit comprising: a pivot member adapted to be fixed to one of two hinged parts and having peripheral irregularities on its outer surface, a metal bushing fitted upon said pivot member by deformation of its inner surface to correspond with the said irregularities therein, a resilient bushing encasing said metal bushing, and an outer sleeve retaining said resilient bushing under initial compression and adapted to be fixed to the other of the hinged parts connected by said unit.

9. A pivot joint unit comprising: a pivot member adapted to be fixed to one of two hinged parts, and having a series of peripheral corrugations on its outer surface, a self-lubricating rigid bushing fitted upon said pivot member and having corrugations in its inner surface corresponding to said pin, a resilient bushing encasing said corrugated bushing, and an outer sleeve retaining said resilient bushing under initial compression.

HARVEY D. GEYER.